United States Patent
Heidrich

(10) Patent No.: US 8,371,638 B2
(45) Date of Patent: Feb. 12, 2013

(54) DRIVE FOR TRANSIT DOOR

(75) Inventor: Peter Heidrich, Des Plaines, IL (US)

(73) Assignee: Wabtec Holding Corp., Wilmerding, PA (US)

( * ) Notice: Subject to any disclaimer, the term of this patent is extended or adjusted under 35 U.S.C. 154(b) by 191 days.

(21) Appl. No.: 12/682,005

(22) PCT Filed: Jul. 24, 2008

(86) PCT No.: PCT/US2008/071013
§ 371 (c)(1),
(2), (4) Date: Jul. 6, 2010

(87) PCT Pub. No.: WO2009/055107
PCT Pub. Date: Apr. 30, 2009

(65) Prior Publication Data
US 2010/0279780 A1    Nov. 4, 2010

Related U.S. Application Data

(60) Provisional application No. 60/981,982, filed on Oct. 23, 2007.

(51) Int. Cl.
B60J 5/06    (2006.01)
(52) U.S. Cl. ............... 296/146.13; 105/286; 464/52; 464/904
(58) Field of Classification Search .......... 464/52, 464/53, 57–60, 97, 140, 904; 105/286, 343; 49/118, 340; 296/146.4, 146.13
See application file for complete search history.

(56) References Cited

U.S. PATENT DOCUMENTS

| | | | |
|---|---|---|---|
| 912,019 A * | 2/1909 | Naulty | 105/343 |
| 1,222,136 A * | 4/1917 | Reynolds | 49/118 X |
| 3,533,125 A | 10/1970 | Buechel et al. | |
| 3,716,013 A * | 2/1973 | Vasilatos | |
| 4,112,708 A | 9/1978 | Fukuda | |
| 4,454,685 A * | 6/1984 | van der Sloot et al. | 49/340 X |
| 4,772,246 A * | 9/1988 | Wenzel | |
| 4,984,776 A * | 1/1991 | Smith | |
| 5,277,104 A * | 1/1994 | Colaner | |
| 5,332,279 A | 7/1994 | Golemis et al. | |
| 5,823,499 A * | 10/1998 | Ito et al. | 464/97 X |
| 6,125,768 A | 10/2000 | Kurnik | |

(Continued)

FOREIGN PATENT DOCUMENTS

| | | |
|---|---|---|
| GB | 1584465 A | 2/1981 |
| WO | 2004106686 A1 | 12/2004 |

(Continued)

OTHER PUBLICATIONS

Universal Joint and Driveshaft Design Manual, AE-7, Society of Automotive Engineers, Inc., Warrendale, PA, pp. 99-101, TJ1079. S62 1979.*

(Continued)

*Primary Examiner* — Gregory Binda
(74) *Attorney, Agent, or Firm* — The Webb Law Firm

(57) ABSTRACT

A multi-part drive shaft for a transit vehicle door comprises an upper drive shaft connected to a door operating mechanism and having a door panel operating arm extending therefrom, a lower drive shaft journaled for rotation, a door panel operating arm extending therefrom and a flexible drive shaft secured at one end to the upper drive shaft and at the other end to the lower drive shaft. Rotation of the upper drive shaft will transfer torque to the lower drive shaft at the same angular speed.

2 Claims, 4 Drawing Sheets

U.S. PATENT DOCUMENTS

| | | |
|---|---|---|
| 6,598,539 B2 | 7/2003 | Oakley |
| 6,708,449 B2 | 3/2004 | Stojc |
| 6,729,250 B2 | 5/2004 | Friestad et al. |
| 6,913,539 B1 | 7/2005 | Scherer |
| 7,228,804 B2 | 6/2007 | Stojc et al. |

FOREIGN PATENT DOCUMENTS

| | | | |
|---|---|---|---|
| WO | 2006072143 | A1 | 7/2006 |

OTHER PUBLICATIONS

Vapor Bus International, "Introduction to Transit Bus Passenger Doors", http://www.nabiusa.com/resource_page.cfm?res_id=7, 2003, 1-4.

"RICON Introduces Pneumatic Door Systems for Buses", RICON Dealer News, Sep. 28, 2005.

* cited by examiner

DRIVE FOR TRANSIT DOOR

BACKGROUND OF THE INVENTION

1. Field of the Invention

This invention relates to the operation of transit doors.

2. Description of Related Art

There are several conventional approaches to vehicular door systems (of the type typically used in bus or rail mass-transit systems). Commonly used approaches include the following.

Swing doors: These are simple double panel doors which swing outward.

Slide-glide doors: Alternatively known as "inward retracting" doors, slide-guide doors have a mechanism that rotates the double door panels outward (similarly to the "swing doors") but simultaneously retract the door panels into the vehicle. The ideal result is that the door panels are seated flat against the entryway perimeter but with the interior surface of the doors exposed rather than the outside surface (allowing handrails and other "interior" hardware to be accessible when the vehicle is stopped and the doors are in the open position, but not exposed on the exterior of the vehicle when the vehicle is in operation).

In each type of door, along each vertical door frame is positioned driven door shafts which through various linkages drive the opening and closing of the adjacent door panels. A number of transit buses have a significant curve back at the top of the front end of the bus such that the upper end of the forward most door panel must also be curved back. In the past, in order to accommodate the curve back of the door, the driven door shaft is comprised of two offset vertical drive shafts 20, 21 joined by an intermediate shaft 23 that has universal joints 24, 25 at each end as shown in FIG. 1. The intermediate shaft 23 has a sliding spline 26 on one end that interfaces a complementary spline on one of the universal joints. This allows the two universal joints to be installed at various distances from each other, thereby accounting for the production tolerances present in the frame of the bus. Arms 27 fixed to the drive shafts 20 operate the door panels to open and close.

There are also situations wherein rectangular doors have two coaxial drive shafts due to the configuration of the walls adjacent the door and/or obstructions between the upper and lower shafts.

Referring to FIG. 2, a rotary actuator 30 drives connecting rods 31, 32 which drive door shaft levers 33, 34 to open and close the doors.

Unfortunately, each universal joint and the spline connection are sources of backlash which must be accounted for in the design of the door. Moreover, each of these elements must be periodically lubricated.

SUMMARY OF THE INVENTION

It is an advantage, according to this invention, to provide a drive for a curved back transit vehicle door opening having offset shafts and rectangular doors having coaxial drive shafts. The offset or coaxial drive shafts are not joined by an intermediate shaft and two universal joints. According to one embodiment of this invention, a multi-part drive shaft for a transit bus door comprises an upper drive shaft journaled for rotation and being connected to a door operator mechanism and having a door panel operating arm extending therefrom, a lower drive shaft being journaled for rotation and having a door panel operating arm extending therefrom. A flexible drive shaft is secured at one end to the upper drive shaft for rotation with the drive shaft and at the other end similarly secured to an output fitting arranged to be clamped and keyed onto the lower drive shaft. Rotation of the upper drive shaft will transfer torque to the lower drive shaft at the same angular speed. Preferably, one or both ends of the flexible drive shaft are releasably secured to the adjacent drive shafts.

BRIEF DESCRIPTION OF THE DRAWINGS

Further features and other objects and advantages will become apparent from the following detailed description made with reference to the drawings in which.

DESCRIPTION OF THE PREFERRED EMBODIMENTS

Typical applications for entryway systems assume a rectangular door opening shape. However, there are special conditions which require more customized door shapes. As an example, some transit buses have significant curvature at the front of the bus, adjacent to the location of the entryway door.

It is desirable for any inwardly-retracting door system, such as a slide-glide system, to conform as closely as possible to the available entryway opening to maximize the clear opening available for passenger ingress/egress. In such a situation, the door may be essentially vertical in the closed position, but may, for example, need to tilt inward at the top by a number of degrees when the door is open in order to best fit the available opening.

Figure 1:
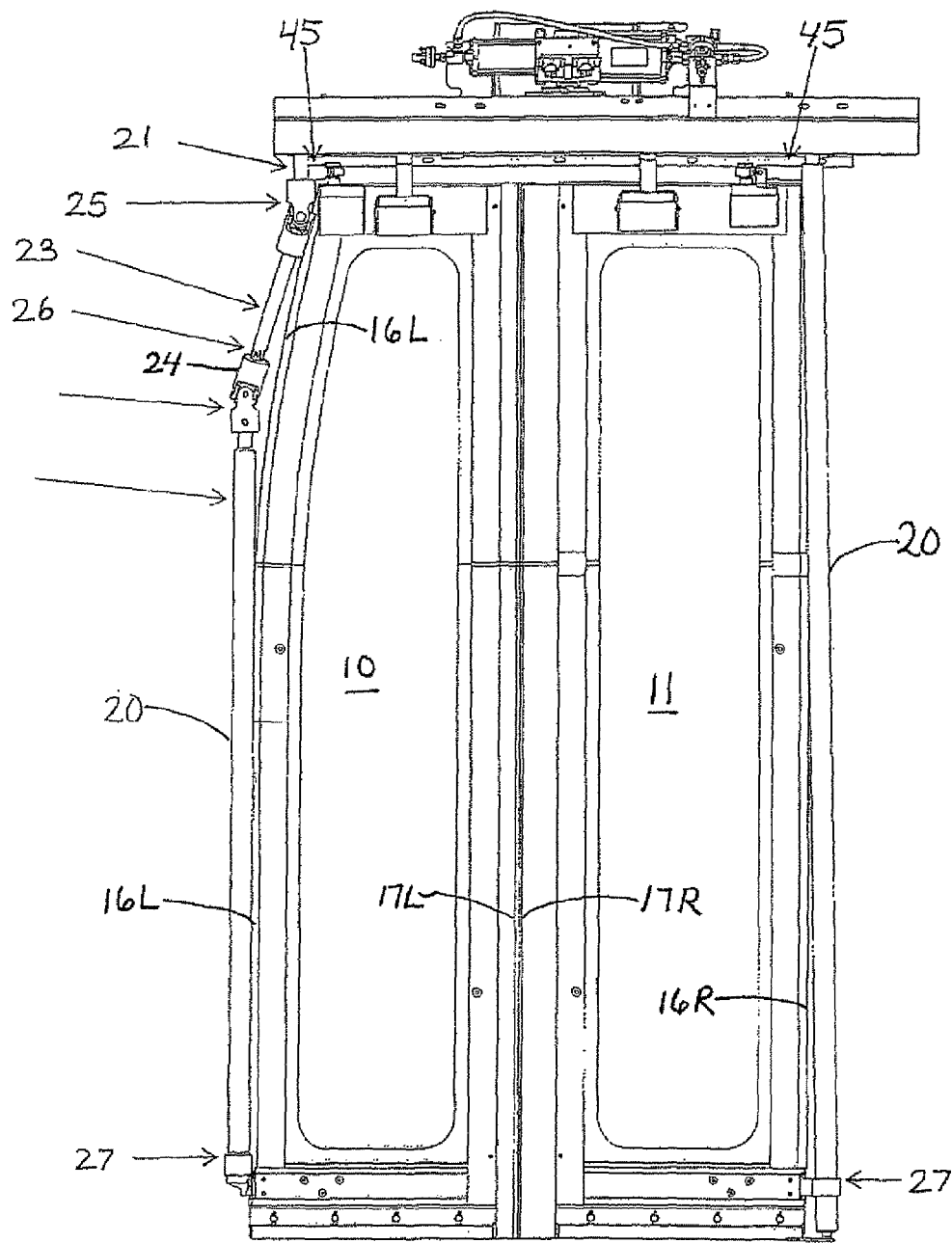
FIG. 1 is a view of a prior art transit bus door having two slide-glide door panels.
Figure 2:
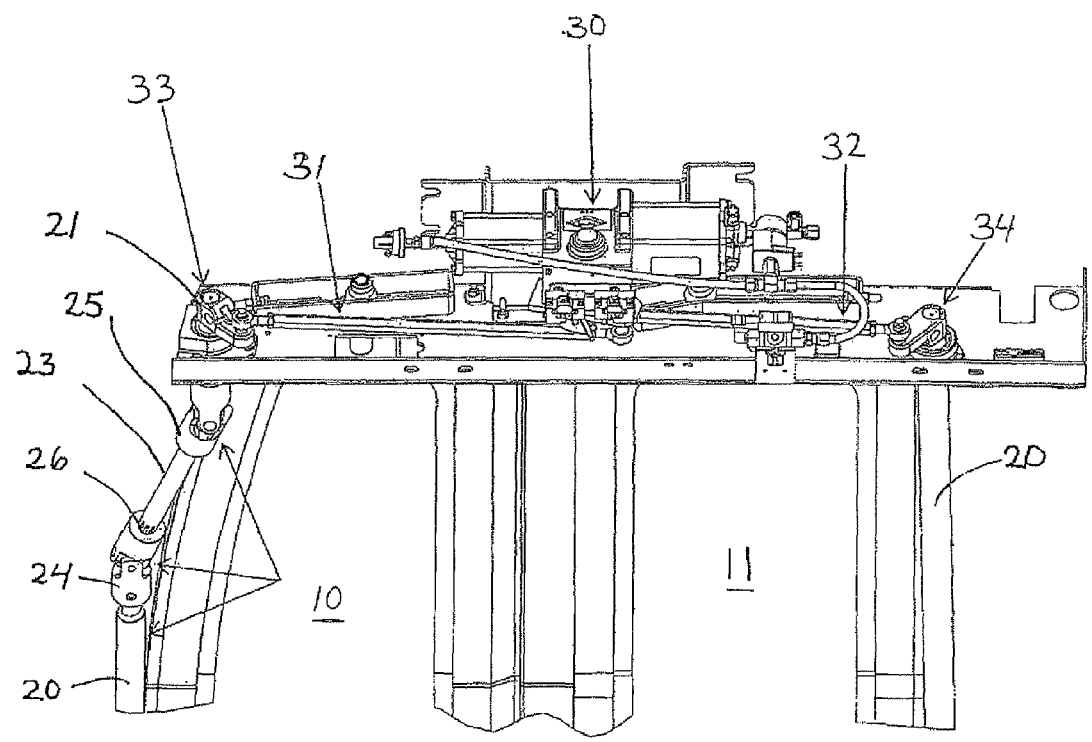
FIG. 2 is a perspective view of an operator and connectors for opening and closing a prior art door shown in FIG. 1.

Referring now to FIGS. 1 and 2, a slide-glide door is shown at the front of a transit bus that is curved back near the roof of the bus. The door comprises two panels 10, 11 that can move independently of each other although they are normally actuated at the same time. The panels fit within the door opening defined by the frame surrounding the door opening.

The panels illustrated in FIGS. 1 and 2 are typical having two opposed lateral edges 16L, 17L, 16R and 17R. Note that while lateral edges may be parallel to each other, it is not uncommon for one lateral edge to have portions that are not parallel to the opposed edge as shown for edge 16L. This is to accommodate the curvature of the front end of the bus. The invention disclosed herein enables the use of slide-glide door panels where a lateral edge is not straight but curves into the door opening at the top. In such a case, as the door panel rotates and retracts inward, it must tilt into the door opening so as not to conflict with the curvature of the door frame. The doors also have opposed end edges.

For slide-glide doors, an essential mechanical feature is the vertical drive shaft alongside the outer edge of the door panel and the door jamb. The drive shafts 20 have a lever secured at the top end that, via connecting rods, is connected to a rotary actuator in a mariner well known in the art. Rotation of the drive shaft causes the opening and closing of the door panels, usually through operating arms that swing upon rotation of the drive shaft.

Figure 3:
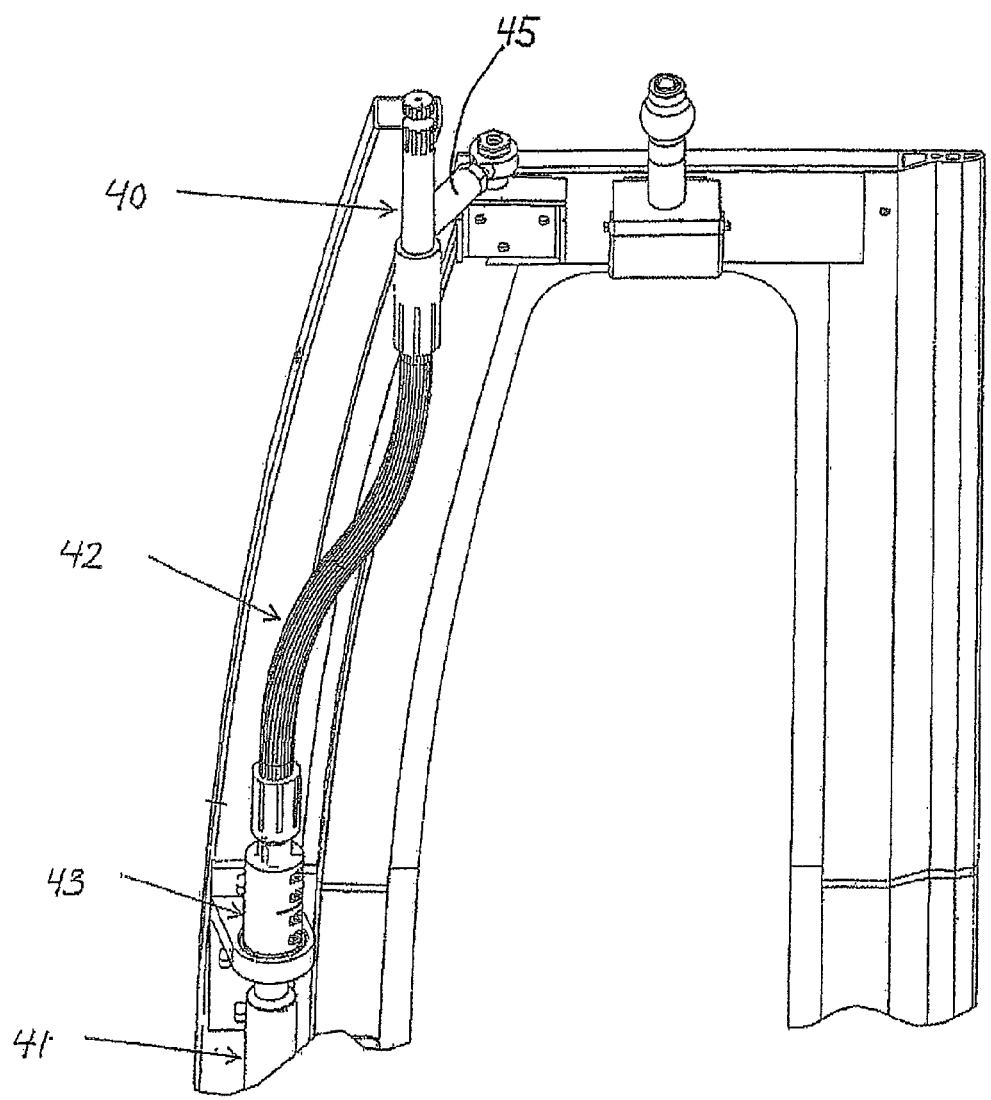
FIG. 3 is a perspective view illustrating one embodiment of this invention.

Referring to FIG. 3, this invention relates to operation of transit doors wherein an upper and lower drive shaft is offset or separated but coaxial. According to a preferred embodiment of this invention, the upper solid rod drive shaft 40 and lower solid rod drive shaft 41 are connected by a flexible core shaft 42 crimped at an upper end into the upper drive shaft. The lower end of the flexible core shaft is crimped into an output fitting 43.

Typically, the flexible core shaft 42 comprises a plurality of coils of closely wrapped wire; the first core member being wrapped on a central mandrel core, and then additional layers are wrapped on one another in alternately opposite helical directions to a desired diameter enabling the transmitting of torque in either direction. A flexible outer tube protects the coils but plays little, if any, role in transmitting torque.

The flexible core shaft 42 is permanently crimped on to the upper drive shaft 40 with a tubular structure that transfers torque between the upper drive shaft and the plurality of coils comprising the flexible core shaft 42. The lower end of the flexible core shaft 42 is likewise crimped to the output fitting 43. The output fitting 43 is releasably attached to the lower drive shaft 41. The output fitting has a keyway for the purpose of relative shaft alignment between upper and lower drive shafts.

Figure 4:
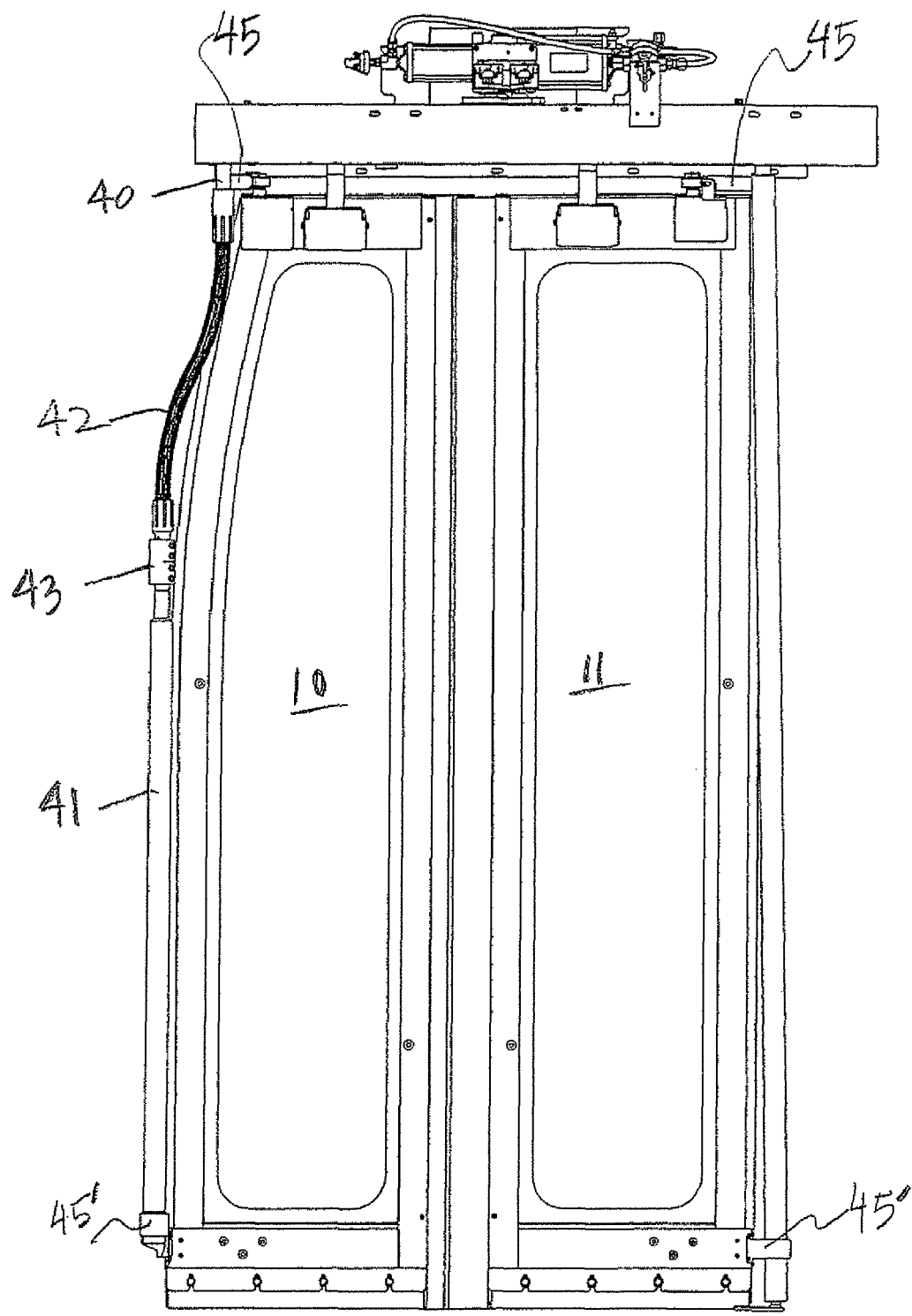
FIG. 4 is an inside elevation view of a transit bus door according to one embodiment of this invention.

The upper drive shaft 40 is held in position by a bearing block (not shown) and is only allowed to rotate. The upper drive shaft 40 is turned by a door operating system of the type well known in the art, thereby turning the flexible core shaft 42. Torque is transferred through the flexible core shaft to the output fitting 43, so the output fitting rotates with the same angular displacement and angular velocity as the upper drive shaft. When the drive shafts rotate, they cause operating arms 45 connected at the top and bottom ends of the drive shafts to move the door panels between open and closed positions. The operating arms are shown in FIG. 4. The straps 45' securing the lower operating arms are also shown in FIG. 4.

The above-described embodiment of this invention has the following advantages over the prior art system comprising two universal joints. There are fewer parts. The installation is simplified. There is less backlash from the driving shaft to the driven shaft. The flexible shaft's flexibility replaces the sliding spline connection used with the universal joints. The universal joint's output speed varies sinusoidally with the input speed. This is a source of vibration. The flexible shaft's speed, on the other hand, stays linear in relation to the input speed. Universal joints require lubrication which means periodic maintenance. A flexible drive shaft requires no lubrication.

The invention claimed is:

1. A multi-part drive shaft for a transit vehicle door comprising:
   an upper substantially vertical drive shaft journaled for rotation and being connected to a door operating mechanism and having a door panel operating arm extending therefrom;
   a lower substantially vertical drive shaft being journaled for rotation, offset from the upper drive shaft and having a door panel operating arm extending therefrom; and
   a flexible drive shaft secured at one end to the upper drive shaft and at the other end to the lower drive shaft, whereby rotation of the upper drive shaft will transfer torque to the lower drive shaft at the same angular speed.

2. The multi-part drive shaft according to claim 1, wherein the flexible drive shaft is releasably secured to at least one of the upper and lower drive shafts.

* * * * *

UNITED STATES PATENT AND TRADEMARK OFFICE
CERTIFICATE OF CORRECTION

PATENT NO. : 8,371,638 B2  Page 1 of 1
APPLICATION NO. : 12/682005
DATED : February 12, 2013
INVENTOR(S) : Peter Heidrich It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 266 days.

Signed and Sealed this

First Day of September, 2015

Michelle K. Lee
*Director of the United States Patent and Trademark Office*